(No Model.)
G. R. HUGON.
PANTOGRAPHIC ENGRAVING MACHINE.
No. 384,764. Patented June 19, 1888.
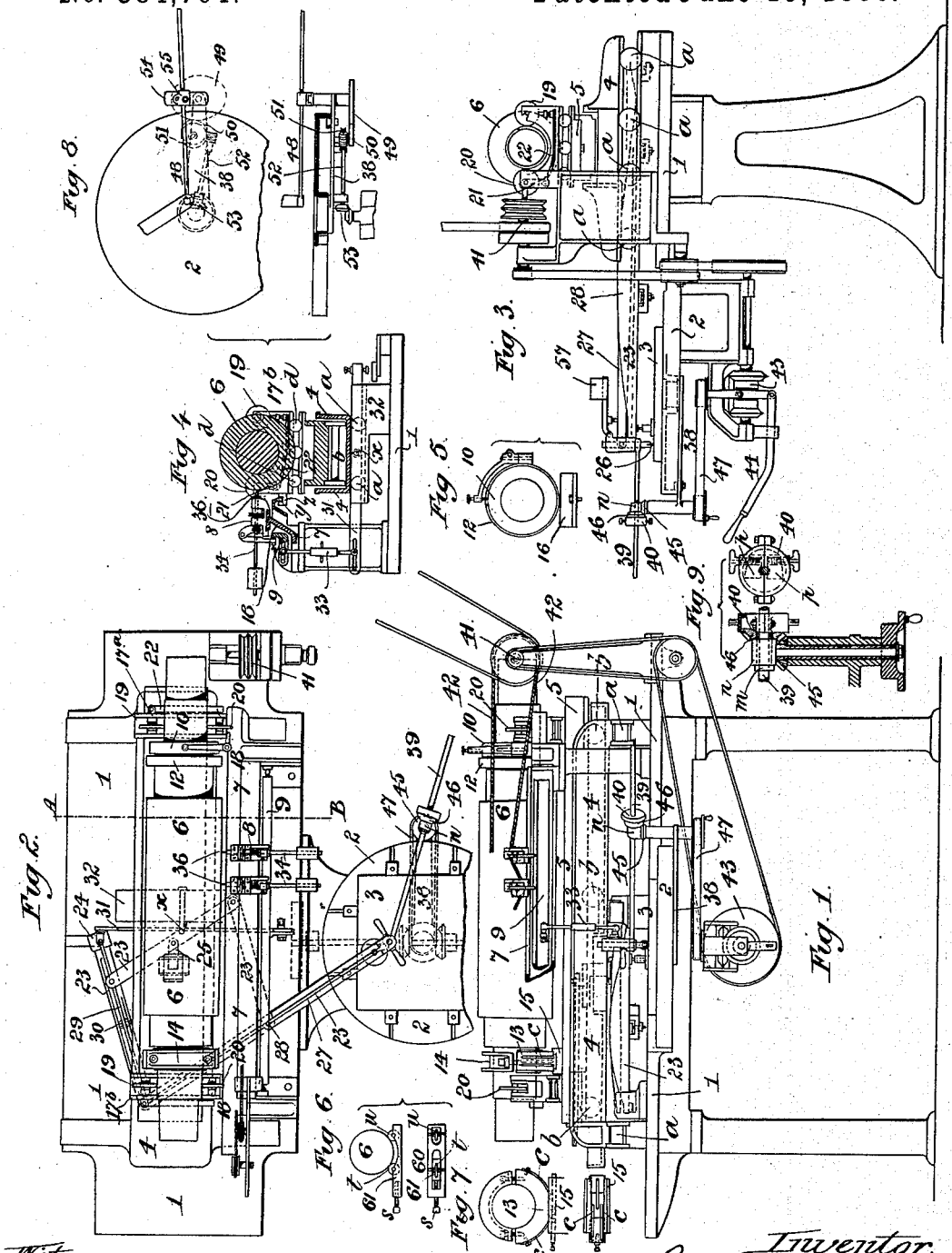
Witnesses:
Philip Mauro,
C. J. Hedrick.
Inventor:
Gabriel R. Hugon.
By A. Pollok
his attorney.

United States Patent Office.

GABRIEL RAPHAEL HUGON, OF SEEDLEY, MOUNT PENDLETON, MANCHESTER, COUNTY OF LANCASTER, ENGLAND.

PANTOGRAPHIC ENGRAVING-MACHINE.

SPECIFICATION forming part of Letters Patent No. 384,764, dated June 19, 1888.

Application filed March 26, 1888. Serial No. 268,464. (No model.) Patented in England January 12, 1886, No. 484; in France October 13, 1886, No. 179,023, and in Germany October 24, 1886, No. 40,154.

*To all whom it may concern:*

Be it known that I, GABRIEL RAPHAEL HUGON, engraver, a subject of the Queen of Great Britain, and residing at Seedley, Mount Pendleton, Manchester, in the county of Lancaster, England, have invented certain new and useful Improvements in Pantographic Engraving-Machines, (for which I have obtained or made application for patents in the following countries: Great Britain, dated January 12, 1886, No. 484; in France, dated October 13, 1886, No. 179,023, and Germany, dated October 24, 1886, No. 40,154,) of which the following is a specification.

My invention has for its principal object to provide machinery to effect the ready and efficient engraving of metal rollers to varying depths for use in embossing or printing, or for analogous uses. The roller to be engraved has affixed to it a disk at each end, and is then mounted on compound carriages so as to be capable of being moved into any position necessitated by the work. The pantographic frame is coupled to these carriages and gives movement to the roller both circumferentially and longitudinally. The drill holder or holders is or are stationary and mounted on a rail. For controlling the depth of the drilling or engraving I have provided the machine with a compound system of levers mounted on the pantographic frame and coupled by a screwed rod to a cam-rail, which moves a weighted lever or levers exerting pressure on the drill or drills. By raising or lowering the tracer which is coupled to the first lever of the said system a direct connection is maintained with the drill or drills, so that if a groove is to be cut varies in depth the same variation is repeated in the roller or surface being engraved. In order to overcome the resistance to the motion which it is desired to give to the tracer I have provided the tracing-table with an arrangement for driving the tracer by power, which may be conveniently effected by a strap-pulley driving a frictional reversing motion which can be engaged at will so as to move the tracer in any direction. Usually in this type of pantograph-machine the roller to be engraved, being mounted on a mandrel, is maintained in a parallel position by being mounted in standards at the ends of the machine, and it is supported by disks on the mandrel resting on roughened surfaces on a compound carriage. In lieu of these standards I maintain the rigidity of the roller under the action of the drill or drills by mounting it at each of its ends in a carriage provided with two friction-wheels, one of which has a fixed position, while the other is carried in a hinged or jointed piece, so that by means of a spring to which the hinged or jointed piece is attached sufficient pressure is obtained to hold the roller-mandrel sidewise, the carriages being provided with means for maintaining the roller parallel, as hereinafter described.

In order that my said invention may be fully understood, I shall now proceed more particularly to describe the same, and for that purpose shall refer to the several figures on the annexed sheet of drawings, the same letters of reference indicating corresponding parts in all the figures.

Figure 1 is a front elevation, Fig. 2 a plan, and Fig. 3 an end elevation, of an engraving-machine constructed according to my invention. Fig. 4 is a transverse section taken along the line A B in Fig. 2, and the remaining figures are details, hereinafter referred to.

1 is the main table of the machine, upon which the surface or article to be engraved is mounted. Fitted to or formed in one with this table is a supplementary table, 2, upon which the pattern or design to be engraved is placed, the said pattern being cut or carved in a block, 3, fixed to the top of said table 2. The roller to be engraved is mounted on a compound carriage, 4 5, the lower carriage, 4, being arranged to travel on rollers or wheels *a* across the table 1, and the top carriage, 5, being arranged to move to and fro upon rollers or wheels *b* over the lower table, 4, in a direction at right angles to the motion of the said lower table.

The surface to be engraved may be either curved or flat; but I have shown on the drawings a cylindrical surface or roller, 6. This roller is supported at its opposite ends on blocks 15 and 16 (shown detached in Figs. 7 and 5, respectively) fixed to the carriage 5. A half-ring, 13, is attached by steel tapes or strips $c$ to the block 15 to insure the roller from slipping when being turned by the motion of the compound carriage under the action of the pantograph.

One end of the cylinder-mandrel bears upon the half-ring 13, and is secured thereon by a strap, 14, partly surrounding the said end of the mandrel and bolted to the half-ring 13. The opposite end of the roller-mandrel is fitted with a ring, 12, resting upon the block 16, and is also fitted with an index, 10, for determining and indicating the position axially of the roller.

Instead of the usual mode of keeping the roller-mandrel in line by standards, I support it, in addition to the rings 12 and 13, between friction-wheels 19 and 20, mounted on the carriages $17^a$ $17^b$, the friction-wheels 20 being each carried in a piece, 21, hinged to a spring, 22, to give side pressure to hold the roller 6 firmly between the said wheels 20 and the opposite wheels, 19. The carriages $17^a$ $17^b$ are supported on wheels $d$, each carriage being provided with a grooved projection, $z$, engaging a continuous lip or projection, $y$, on a fixed rail, 18, along which lip or projection the carriages $17^a$ $17^b$ are traversed for the purpose of bringing different portions of the roller 6 under the action of the drills or engraving-tools 36, as hereinafter described, the said roller being maintained parallel to the rail 18 during its longitudinal movements by the projections $z$ and $y$.

The drills or engraving-tools are mounted in frames 8, carried on the longitudinal rail 7, and are maintained in contact with the roller 6 by weighted levers 34, pressing against the outer ends of the drill-spindles, the depth to which the drills are required to penetrate the roller being regulated by a rocking bar, 9, against which a tail-piece on each of the weighted levers 34 is made to bear. The bar 9 is connected by a link, 33, to one end of a lever, 31, centered at $x$ to a block, 32, fixed on the table 1, its opposite end being in contact with another lever, 29, centered at 30 to one of the bars of the pantograph 23. The pantograph is fulcrumed at 24 to the table 1, and is connected at 25 to the carriage 5, upon which the cylinder 6 is mounted. To this pantograph is also hinged at 28 a lever, 27, in one end of which the tracing-point 26 is fixed, so that when the tracing-point is traversed over curved surfaces on the pattern-block 3 a corresponding motion will be transmitted, through the several levers referred to, to the drills 36, thereby producing on the roller 6 corresponding curved surfaces on a reduced scale.

The tracing-point 26 is traversed mechanically over the pattern in the following manner: To the under side of the pattern-table 2 is centered a radius-arm, 38, capable of being rotated and fixed at any desired point round the said table. The outer end of the radius-arm is provided with a socket in which is fitted to rotate a vertical spindle driven by a strap, 47, from the reversing-gear 43, which receives motion by pulleys and driving-straps, as shown in Fig. 3, from the shaft 41. On the upper end of the vertical spindle (as shown clearly in the sectional view, Fig. 9) is fixed a bevel-wheel, 45, gearing with a corresponding wheel, 46, fitted on a sleeve or collar, $m$, mounted so as to revolve in a swiveling head-piece on the vertical spindle. In this head-piece $n$ rests a screwed rod, 39, which is hinged at one end to the socket 26, carrying the tracing-point. The outer end of the said rod is capable of being moved round the table 2 into any required position. The wheel 46 is provided with a box, 40, containing two half-nuts, $p$, which when desired may be caused to engage the screw-thread on the rod 39 and thereby impart to the said rod by means of the reversing motion 43 and lever 44 a longitudinal movement in one direction or the other, and thus cause the tracing-point 26 to move in a corresponding direction over the pattern on the table 2. It will thus be seen that by means of these longitudinal motions of the rod 39 in combination with the adjustment of the radius-arm 38, the tracing-point 26 may be guided by power over the whole surface of the pattern-block 3, and impart through the pantograph 23 a corresponding movement to the roller 6, thereby presenting the surface thereof to the action of the drills, which are rotated from the shaft 41 by the band or cord 42, and will effect the engraving of the surface presented to them corresponding to the pattern over which the tracing-point is caused to travel. The tracing-point 26 is kept in contact with the pattern by a weighted lever, 57.

Figure 8 represents in sectional elevation and plan an arrangement for guiding the tracing-point when slots of a given length are required to be drilled in the roller. Instead of the miter-gearing 45 46, hereinbefore described, a bar, 54, having a dovetail projection on the top face is fixed on the upper end of the vertical spindle, which turns in the socket at the end of the bar 38, and on the dovetail projection is fitted to slide a piece, 55, through which passes a plain rod, 48, one end of which is connected to the socket which carries the tracing-point 26. The piece 55 is capable of being adjusted and fixed in any required position on the bar 54, according to the length of the slots to be drilled. The spindle upon which the bar 54 is fixed carries at its lower end an elliptical-toothed wheel, 49, in gear with an eccentric-toothed wheel, 50, mounted on a stud on the radial bar 38, on which stud is also mounted a worm-wheel, 51, in gear with a worm fast on one end of a shaft, 52. This shaft rotates in bearings on the bar 38 and receives motion by means of the gearing 53 from the reversing mechanism 43 44, hereinbefore described with reference to Figs. 1, 2, and 3.

Upon imparting motion to the shaft 52 motion will be transmitted through the worm and worm-wheel 51 and the wheels 50 and 49 to the spindle carrying the bar 54, causing the tracing-point 26 to travel over the pattern-surface a greater or less distance, according to the position in which the piece 55 is fixed on the bar 54, the cylinder 6 being moved by the pantograph a correspondingly proportionate distance in front of the drills or engraving-tools.

In order to facilitate the rotation of the roller 6 to bring another portion of its circumference under the action of the drills, the carriages $17^a$ $17^b$ are each provided with a frame, 60, (shown in Fig. 6,) containing a friction-roller, $u$, and a sliding block, 61, also provided with a friction-roller, $t$. This block is acted upon by a screw, $s$, fitted to turn in the frame 60, so that by turning the said screw in one direction the friction-roller $t$ is caused to approach the roller $u$, and thereby raise the roller 6 from its bearing on the blocks 15 and 16, the strap 14 having been previously released from the half-ring 13. The roller 6 may then be readily turned to the required extent, which may be determined by the index-wheel 10, and be again fixed in its adjusted position by first withdrawing the friction-rollers $t$ to admit of the roller 6 seating itself on the blocks 15 and 16, and then tightening up the strap 14 the process of engraving may then be proceeded with, as hereinbefore described.

Having now described and particularly ascertained the nature of my said invention and in what manner the same is to be performed, I declare that what I claim is—

1. In a pantograph engraving-machine, the combination, with the drills mounted in stationary supports, of the compound carriage whose parts have motions in different directions, the supporting-blocks for the roller on said carriage, and the pantograph-frame coupled to the compound carriage and giving motion to said roller, substantially as described.

2. The combination, with the pantograph-frame and compound carriage coupled thereto for supporting the roller to be engraved, of the means for maintaining the roller rigid under the action of the drills, said means consisting in friction-wheels, one having a fixed position and the other pressing on the roller by spring-pressure, substantially as described.

3. The combination, with the drills, compound carriage, pantograph-frame, and tracing-point, of the weighted levers exerting pressure on the drills, the rocking bar or rail for acting on said weighted levers and regulating the depth of action of the drills, and the compound system of levers for communicating the motion of said tracing-point to said rocking bar or rail, substantially as described.

4. In a pantograph-engraving machine, the combination, with the tracer, of a longitudinally-movable rod connected therewith, and a pivoted arm carrying said rod, by the combined movements of which rod and arm the tracer can be moved over the whole surface of the pattern-plate, and the reversing-gear and connections for moving said tracer, substantially as described.

5. A pantograph engraving-machine comprising the following elements in combination: a compound carriage for the article to be engraved, the pantograph-frame coupled to said compound carriage, the drills or graving-tools, the system of levers for controlling the depth of action of said drills from said pantograph-frame, the tracer, and the means for guiding said tracer by power, substantially as described.

In testimony whereof I have signed my name to this specification in the presence of two subscribing witnesses.

GABRIEL RAPHAEL HUGON.

Witnesses:
 FREDERICK TODD,
  16 *Church Street, Pendleton, Lancashire.*
 JAMES POTTER,
  *Seedley Rd., Pendleton.*